United States Patent [19]

Bergeron, Jr.

[11] Patent Number: 4,474,055

[45] Date of Patent: Oct. 2, 1984

[54] HYDROSTATIC PIPE TESTING APPARATUS

[76] Inventor: Stanley Bergeron, Jr., 38 HMS Ct., Houma, La. 70360

[21] Appl. No.: 398,948

[22] Filed: Jul. 16, 1982

[51] Int. Cl.³ .......................................... G01M 3/02
[52] U.S. Cl. ...................................... 73/49.5; 73/49.1
[58] Field of Search ................... 73/49.5, 49.1, 49.6, 73/49.4, 46

[56] References Cited

U.S. PATENT DOCUMENTS

| | | | |
|---|---|---|---|
| 2,578,728 | 12/1951 | Musser | 73/49.5 |
| 2,953,919 | 9/1960 | Potts | 73/49.5 |
| 2,955,458 | 10/1960 | Sonnier et al. | 73/49.5 X |
| 3,678,560 | 7/1972 | Dufour et al. | 73/46 X |
| 3,712,115 | 1/1973 | Miller | 73/49.1 |
| 4,081,990 | 4/1978 | Chatagnier | 73/49.1 X |
| 4,182,159 | 1/1980 | Churchman | 73/49.5 X |
| 4,373,380 | 2/1983 | Mayo | 73/49.1 X |

OTHER PUBLICATIONS

Nasa Paper Titled "Pressure Testing Piping and Tubing" (MSC-15185).

*Primary Examiner*—Gerald Goldberg
*Assistant Examiner*—Tom Noland
*Attorney, Agent, or Firm*—Thomas S. Keaty

[57] ABSTRACT

A hydrostatic pipe testing tool for use in oil field in cooperation with the bar string has upper and lower mandrel tools substantially identical and comprising a cylindrical collar threadably connected to a cylindrical piston and coaxially alligned with it so the central bores of the collar and the piston fluidly communicate with each other. A shaft integrally attached to the piston has a sleeve slidably mounted thereon. Two resilient sealing elements are spaced by three steel spacer rings and mounted circumferentially and slidably on the sleeve. Another sleeve is provided for attaching the shaft and the first sleeve to a bar string. The filling port of enlarged diameter is made perpendicularly in relation to the central bore in the piston portion of the mandrel and a filling jet is disposed at 45° angle in relation to the central bore. A plurality of O-rings define fluidly sealed chambers for facilitating testing of the tubing within a well bore.

3 Claims, 11 Drawing Figures

HYDROSTATIC PIPE TESTING APPARATUS

BACKGROUND OF THE INVENTION

1. Field of the Invention

The present invention relates generally to tools for interior hydrostatic pressure testing of tubing, pipe, and other flow conductors. In order to economically maintain and repair long flow conductors such as tubing in a well, it is important to locate any leaks prior to beginning a maintenance evaluation. The present invention relates to an improved apparatus for pressure testing pipe, particularly tubing such as used in oil wells.

2. Description of the Prior Art

In testing of tubing strings, the testing is usually performed while the pipe sections are being made up into the pipe string and lowered into the well.

Conventional testing tools for pressure testing flow conductors comprise mandrel means, packing elements carried on the exterior of said mandrel means, a flow passage through said mandrel means having openings on either side of said packing element, means for expanding said packing elements to form a seal between said mandrel means and said flow conductor, and means for securing said tool at a desired location within said flow conductor. Some of these testing tools employ both a lower and upper mandrel means, connected by a string of bars having a flow passage which communicates with the flow passage provided in the upper and lower mandrel means, the upper mandrel means being provided with a port entry for receiving hydrostatic fluid, the port communicating with the flow passage of the upper mandrel means down the string of bars and down into the lower mandrel means, and after filling up the string of bars, the hydrostatic fluid escapes the lower mandrel means by means of a transverse bore provided in the lower mandrel means, said transverse bore communicating with said flow passage in said lower mandrel means, the escaped fluid causing said packing elements to expand and form a seal between said lower mandrel means and said flow conductor, and after this seal is formed, said fluid creates a back pressure through the transverse bore of and through the flow passage of the lower mandrel means and the string of bars, ultimately escaping through a transverse bore provided in the upper mandrel means, said transverse bore communicating with said flow passage in said upper mandrel means, said escaped fluid causing said packing elements to expand and form a seal between said upper mandrel means and said flow conductor. After the two seals have been formed by the packing elements of both lower and upper mandrel means, hydrostatic fluid is allowed to escape through an escape port provided in said lower mandrel means, said hydrostatic fluid then filling the cavity between the string of bars and the tubing being tested, and after the hydrostatic fluid fills up this cavity, the hydrostatic fluid is allowed to enter until the desired hydrostatic pressure is formed within the cavity between the bars and the flow conductor for testing the flow conductor.

Many problems have arisen with the apparatuses of the prior art, specifically:

(i) the devices of the prior art have insufficient hydrostatic pressure testing range capabilities for testing the flow conductor, as the range is generally from 3,000 p.s.i. of hydrostatic pressure to 15,000 p.s.i. of hydrostatic pressure;

(ii) a transverse bore is provided in the shaft portion of the upper and lower mandrel means, thereby weakening the shaft, often times resulting in blowout of the tool because of shaft breakages which are primarily caused due to the weakening of the shaft by the transverse bore;

(iii) the transverse bore is disposed perpendicularly to the flow passage means, thereby prohibiting the outflow of "trash" (i.e., coagulative particulates) from the flow passage through the transverse bore, thereby causing the buildup of this trash which ultimately causes the transverse bore to clog up, thereby preventing escape of the fluid, thereby preventing radial expansion of the sealing elements, or "setting" of the mandrel means, thereby preventing the testing of the flow conductor due to lack of a proper seal;

(iv) leakages have frequently occurred at the connection of the bar string with both the lower and upper mandrel means, thereby preventing "setting" of the mandrel tool.

The present invention has for its primary object provision of an improved form of testing tool which obviates the principle disadvantages, such as those pointed out above, in existing tools.

The present invention employs a larger filling jet for the purpose of broadening the scope of the hydrostatic testing range. The transverse bores are provided in the piston portion of the mandrel means vis-a-vis the shaft portion, thereby preventing approximately 90% to 99% of shaft breakages or blowouts which are primarily caused due to the weakening of the shaft by the transverse bore; by disposing the transverse bore in the piston portion which is more solid and which has a greater diameter than the shaft portion, 90-99% of tool blowouts or shaft breakages have been eliminated; these breakages (shaft "explodes" and splits into two pieces) require purchase of a new testing tool (which is expensive), impair the speed and efficiency of the ongoing oil rig operation, and could result in great harm to workmen on the oil rig; also, the transverse bore is located at an approximately 45° angle to the flow passage rather than perpendicular thereto, which is the present state of the art, and this feature inhibits breakage of the mandrel means and further, and most importantly, eliminates the buildup of trash in the flow passage by allowing trash (i.e. coagulative particulates) from building up inside of the flow passage, which buildup ultimately causes the transverse bore to block up, thereby preventing escape of the fluid to radially expand the sealing elements or "set" the mandrel means, thereby preventing hydrostatic testing of the flow conductors. Also, a pair of O-rings are provided on the shaft portion of the lower and upper mandrel means for preventing the leakage of the test fluid at the connection of the bar string with both the upper and lower mandrel means.

Other and more specific objects and advantages of this invention will become more readily apparent from the following description when read in conjunction with the accompanying drawings which illustrate a useful embodiment of a pipe testing tool in accordance with the present invention.

DETAILED DESCRIPTION OF THE DRAWINGS

Figure 6:
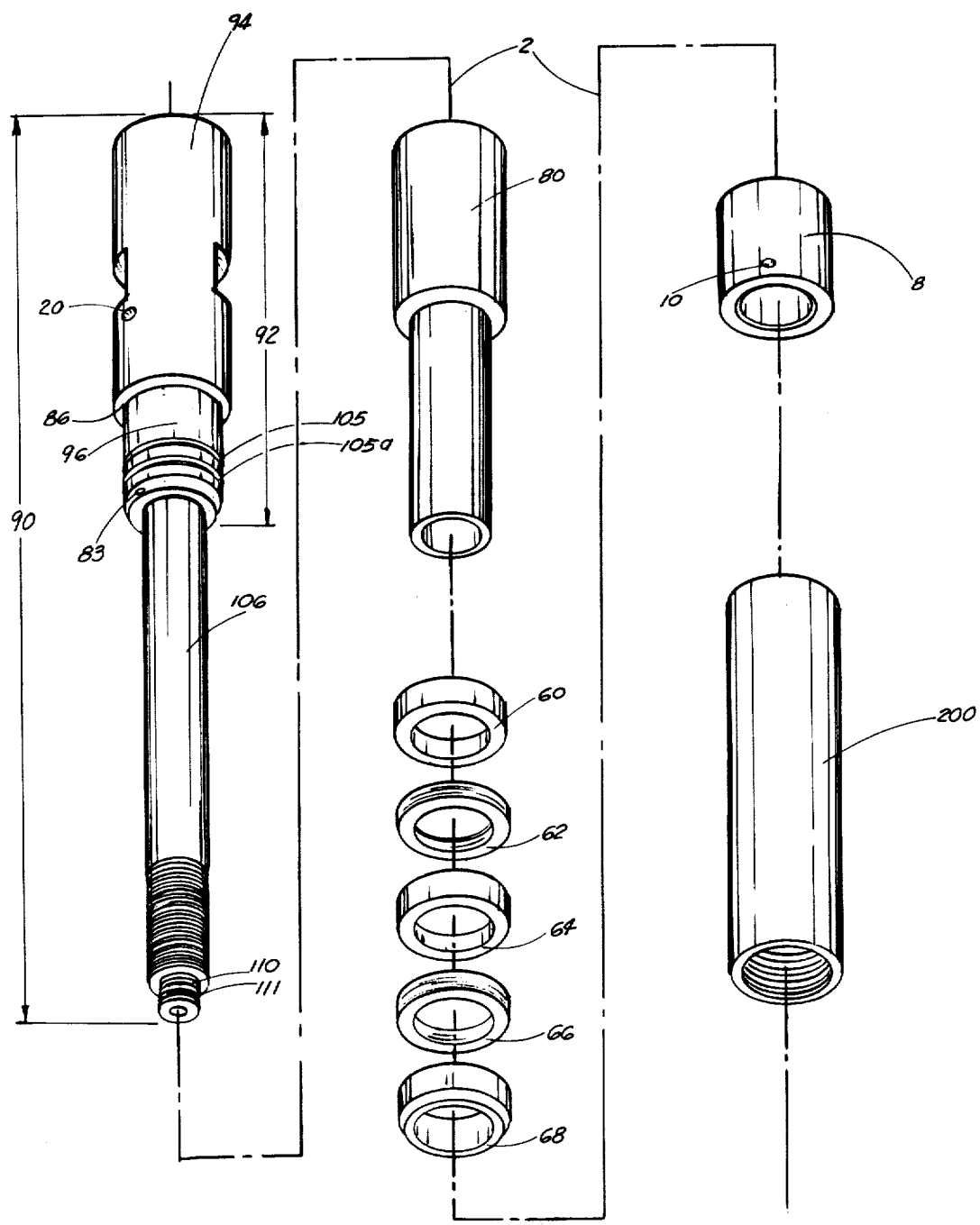

FIG. 6. is an exploded view of the upper mandrel tool.

Figure 7:
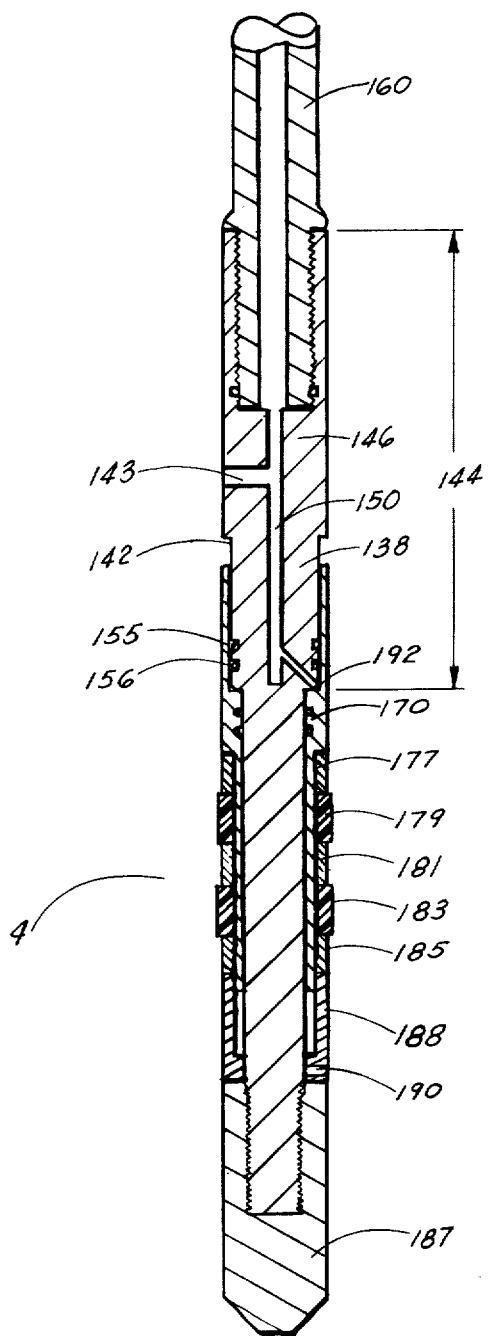

FIG. 7 is a cross-sectional, elevational view of the lower mandrel tool.

Figure 8:
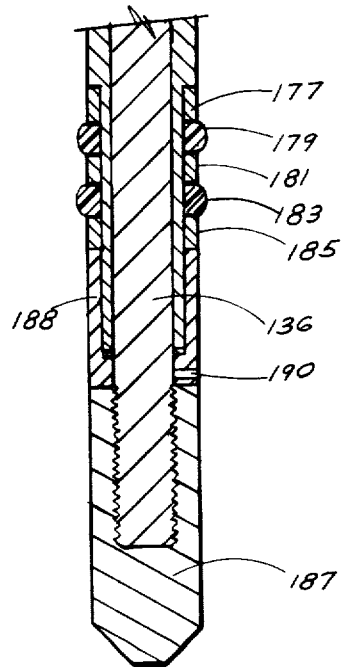

FIG. 8 is a cross-sectional, elevational view of the lower half of the lower mandrel tool with the sealing elements expanded.

Figure 9A:
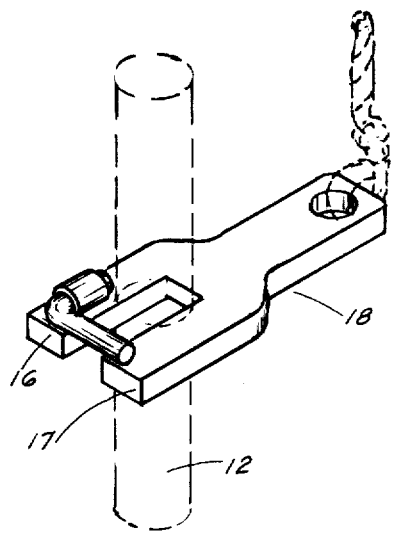
Figures 9, 10:
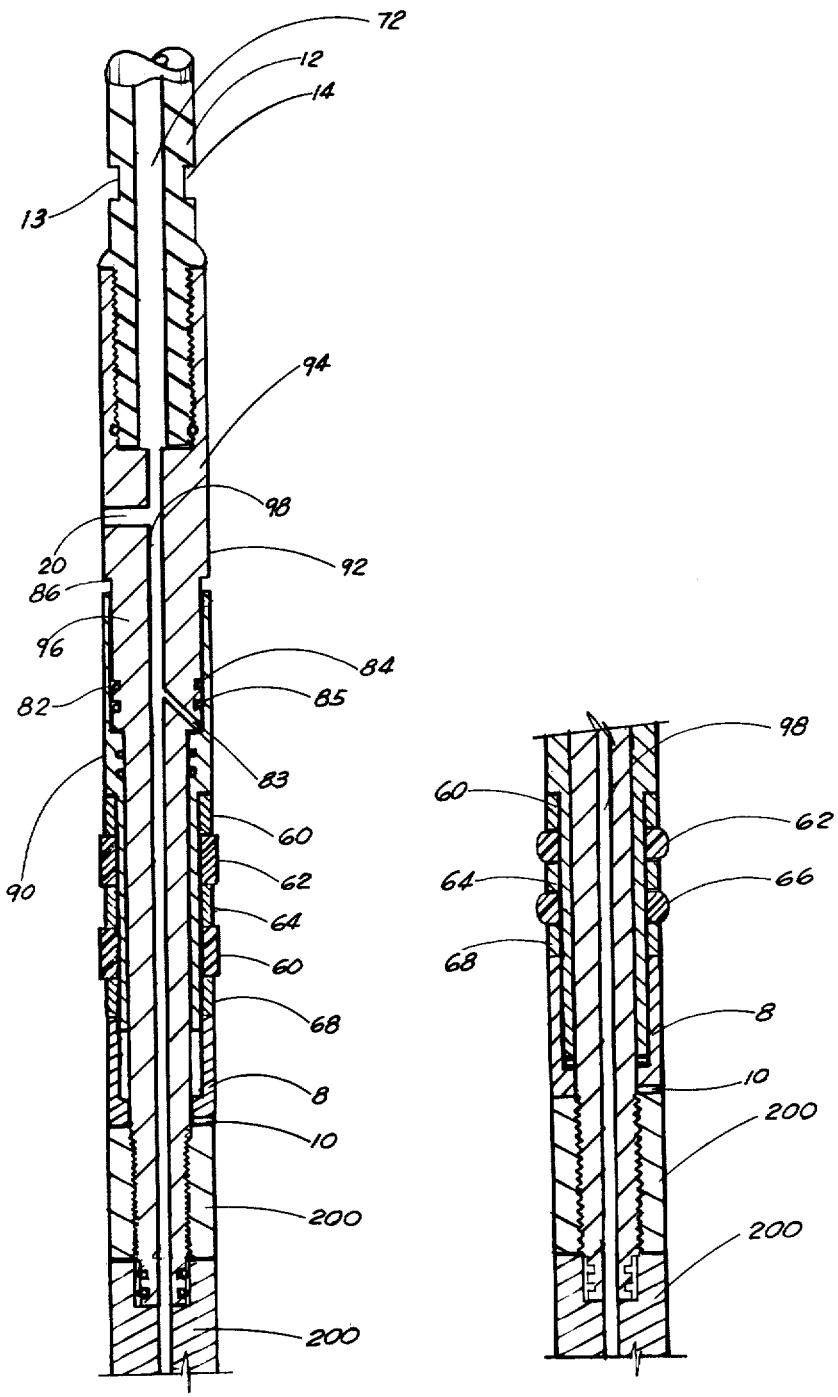

FIG. 9 is a cross-sectional, elevational view of the upper mandrel tool.

FIG. 9a is a partial, elevational view of the top collar of the upper mandrel tool shown cooperating with the hanging plate which travels upwardly and downwardly within the oil derrick.

FIG. 10 is a cross-sectional, elevational view of the bottom half of the upper mandrel tool, with the sealing elements expanded.

DETAILED DESCRIPTION OF THE PREFERRED EMBODIMENT

Figures 1, 2:
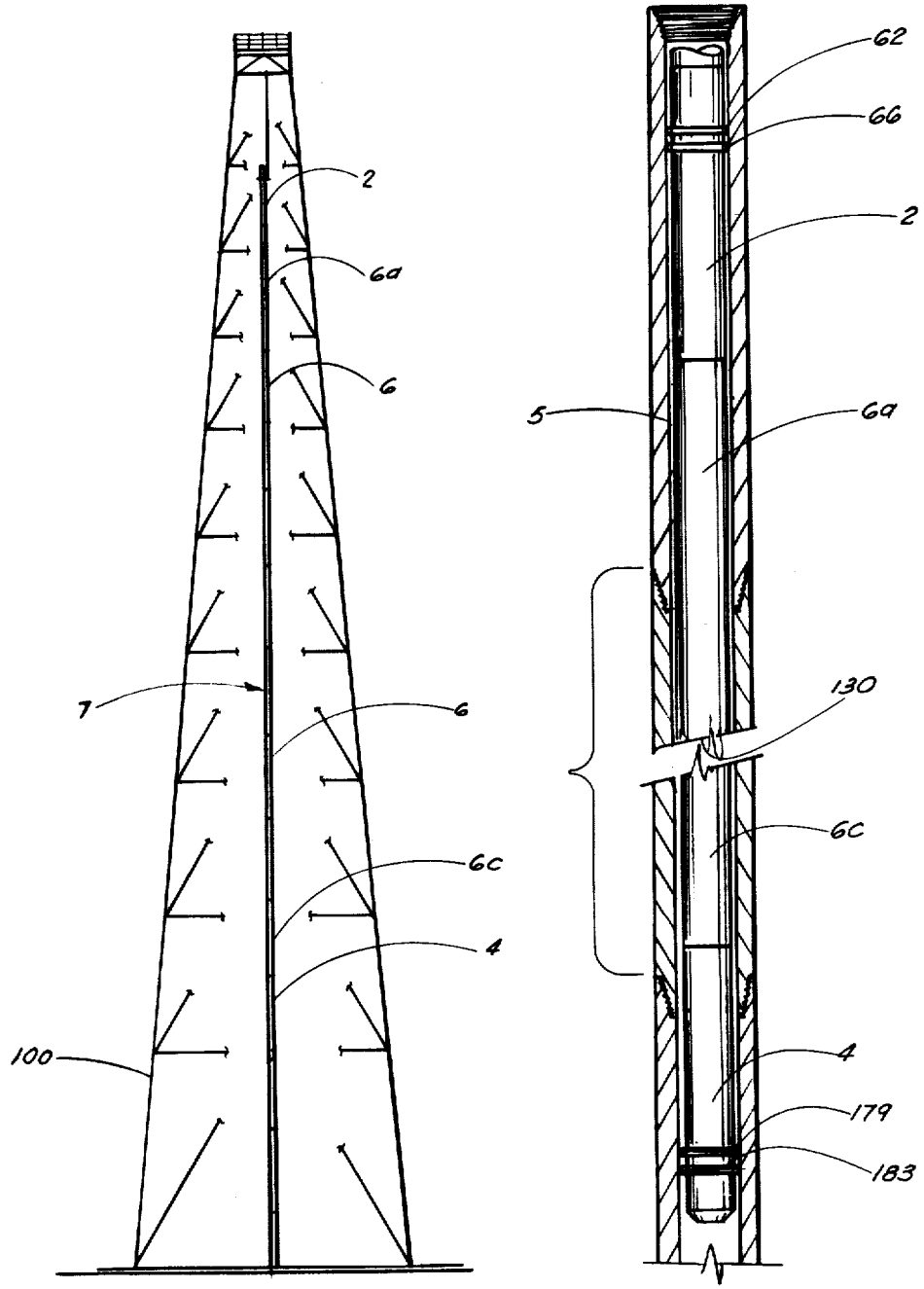
FIG. 1 is a frontal, elevational view of the apparatus of the present invention within an oil derrick.
FIG. 2 is a cross-sectional partial frontal, elevational view of the apparatus of the present invention within a drill pipe.

Referring now to the drawings, and particularly to FIG. 1, there can be seen the apparatus of the present invention comprised of an upper mandrel tool 2 and a lower mandrel tool 4 connected to each other by a series of tubular bars 6, referred to collectively as bar string 7, for hydrostatically testing the fluid pressure bearing capacity of flow conductors, for example, drill pipe 5, as seen in cross-section in FIG. 2.

Figure 3:
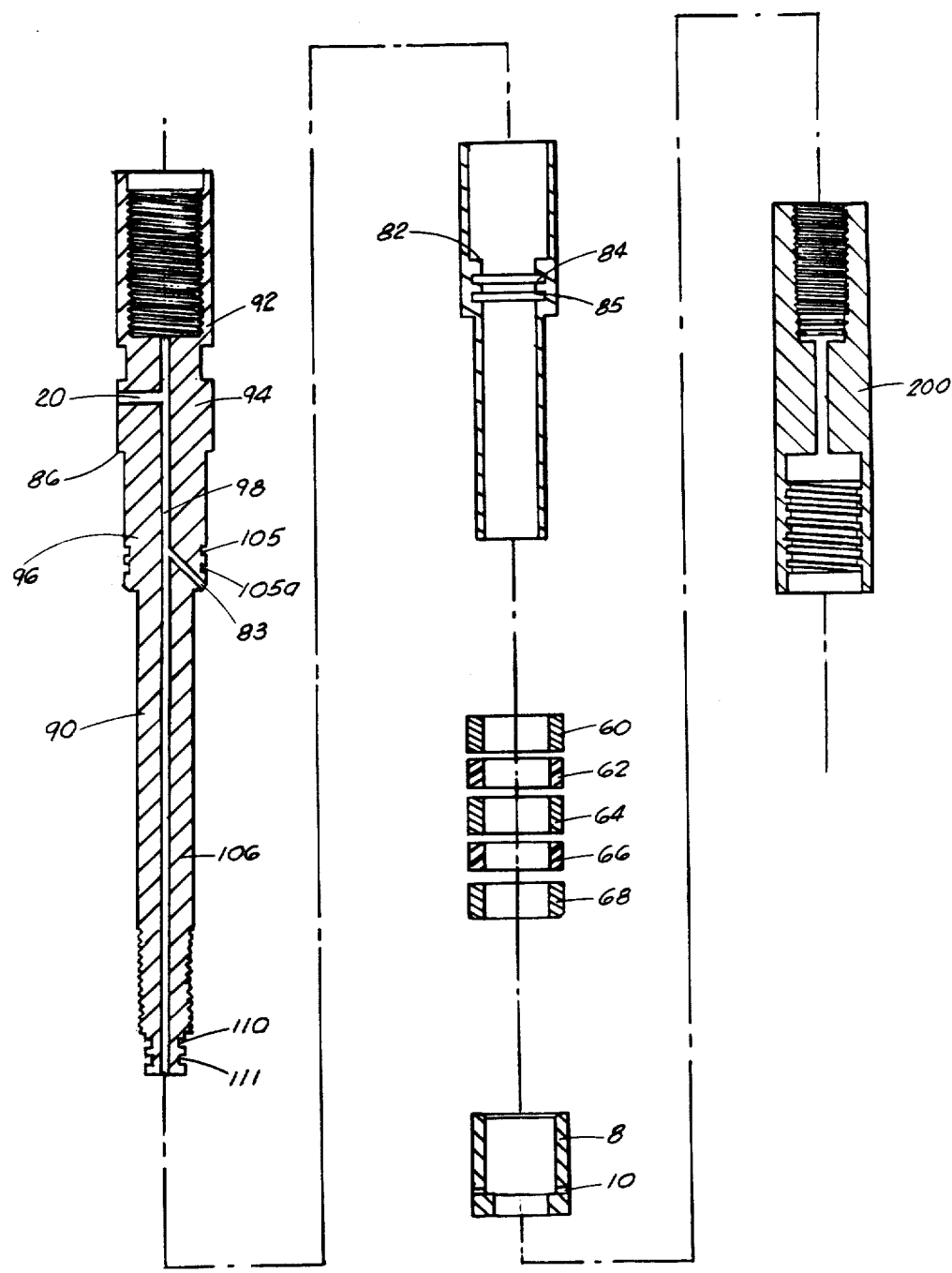
FIG. 3 is an exploded, cross-sectional view of the upper mandrel tool.

Referring now to FIGS. 3 and 9, there can be seen the upper mandrel tool 2. The upper mandrel tool 2 comprises:

a. A generally cylindrical, longitudinally elongated collar 12 mated on its bottom end to the top end of piston portion 92 of upper mandrel tool body 90 (described in b. below), collar 12 having recesses 13, 14, provided through its outer surface diametrically opposite each other for cooperating with the forks 16, 17 of the hanging plate 18 (as seen in FIG. 9a) which travels up and down within the oil derrick 100, thereby facilitating the insertion and removal of upper mandrel tool 2, bar string 7 and lower mandrel tool 4 into drill pipe 5. Collar 12 comprises a longitudinal bore 22 throughout the entire length of collar 12 for allowing the flow of test fluid therethrough;

b. as seen in FIGS. 3, 6 and 9, an upper mandrel tool body 90 connected on its upper end to the lower end of collar 12, comprising:

(i) an uppermost piston portion 92 having a solid, generally cylindrical topmost portion 94 and a solid, generally semi-hemispherical bottommost portion 96 continuously attached thereto, bottommost portion 96 having a pair of spaced-apart O-rings 105, 105a mounted thereto;

(ii) a lowermost shaft portion 106 comprising a longitudinally elongated shank 106 continuously attached on its upper end to the lower end of bottommost portion 96 of piston portion 92, substantially along the longitudinal axis of piston portion 92, preferably, shaft portion 106 being machine-threaded on its lower end for mating sleeve 200 which mates topmost tubular bar 6a of bar string 7, a pair of spaced-apart O-rings 110, 111 being circumferentially mounted to the machine-threaded portion of shaft portion 106, for preventing any leakage from occurring at the connection of shaft portion 106 and sleeve 200;

(iii) piston portion 92 and shaft portion 106 comprise a longitudinal bore 98, or upper fluid flow passage 98 for allowing the flow of test fluid therethrough, fluid flow passage 98 being aligned with longitudinal bore 130 (FIG. 2) provided through bar string 7, for allowing the flow of test fluid therethrough and aligned with longitudinal bore 22 of collar 12 for receiving test fluid therefrom;

(iv) topmost portion 94 of piston portion 92 comprises a transverse bore 20, or receiving port 20 near its top end for receiving hydrostatic test fluid (not shown) from some source of test fluid (not shown) which could be a positive displacement water pump, for example, transverse bore 20 communicating with longitudinal bore 98 for delivering, or injecting the test fluid therethrough;

c. As seen in FIGS. 3, 6 and 9, an upper tool cylinder 80 having a lower, internal shoulder 82 and a pair of spaced-apart O-rings 84, 85 mounted therein just above shoulder 82, circumferentially mounted to the shaft portion 106 of upper mandrel tool body 90, the bottom surface of upper tool cylinder 80 communicating with the top surface of a first spacer ring 60 (as described in d. below), and the top surface of upper cylinder 80 communicating with the shoulder 86 formed by the top surface of bottommost portion 96 of piston portion 92, and the topmost portion 94 of piston 92;

d. A first spacer ring 60, a first resilient, elastomeric, radially expansible sealing element 62, a second spacer ring 64, a second resilient elastomeric, radially expansible sealing element 66, and a third spacer ring 68, circumferentially mounted from top to bottom, respectively, to the shaft portion 106 of upper mandrel tool body 90, the top surface of first spacer ring 60 communicating with the bottom surface of upper tool cylinder 80, the bottom surface of first spacer ring 60 communicating with the top surface of first sealing element 62, the bottom surface of first sealing element 62 communicating with the top surface of second spacer ring 64, the bottom surface of second spacer ring 64 communicating with the top surface of second sealing element 66, and the bottom surface of second sealing element 66 communicating with the top surface of third spacer ring 68. Spacer rings 60, 64, 68 are preferably made of steel and sealing elements 62, 66 are preferably made of mylar, rubber, or any other suitable elastomeric material, expansible by fluid velocity for radial expansion for sealing engagement with the inner surface of drill pipe 5.

e. A generally cylindrical sleeve 8, or upper tattle tale 8, preferably made of steel, and having a fluid escape port 10, circumferentially mounted to the shaft portion 106 of upper mandrel tool body 90, the top surface of tattle tale 8 communicating with the bottom surface of third spacer ring 68, and the bottom surface of tattle tale 8 communicating the top surface of connector sleeve 200 which is mated on its top end to shaft portion 106 and on its bottom end to topmost tubular bar 6a of bar string 7.

Figure 4:
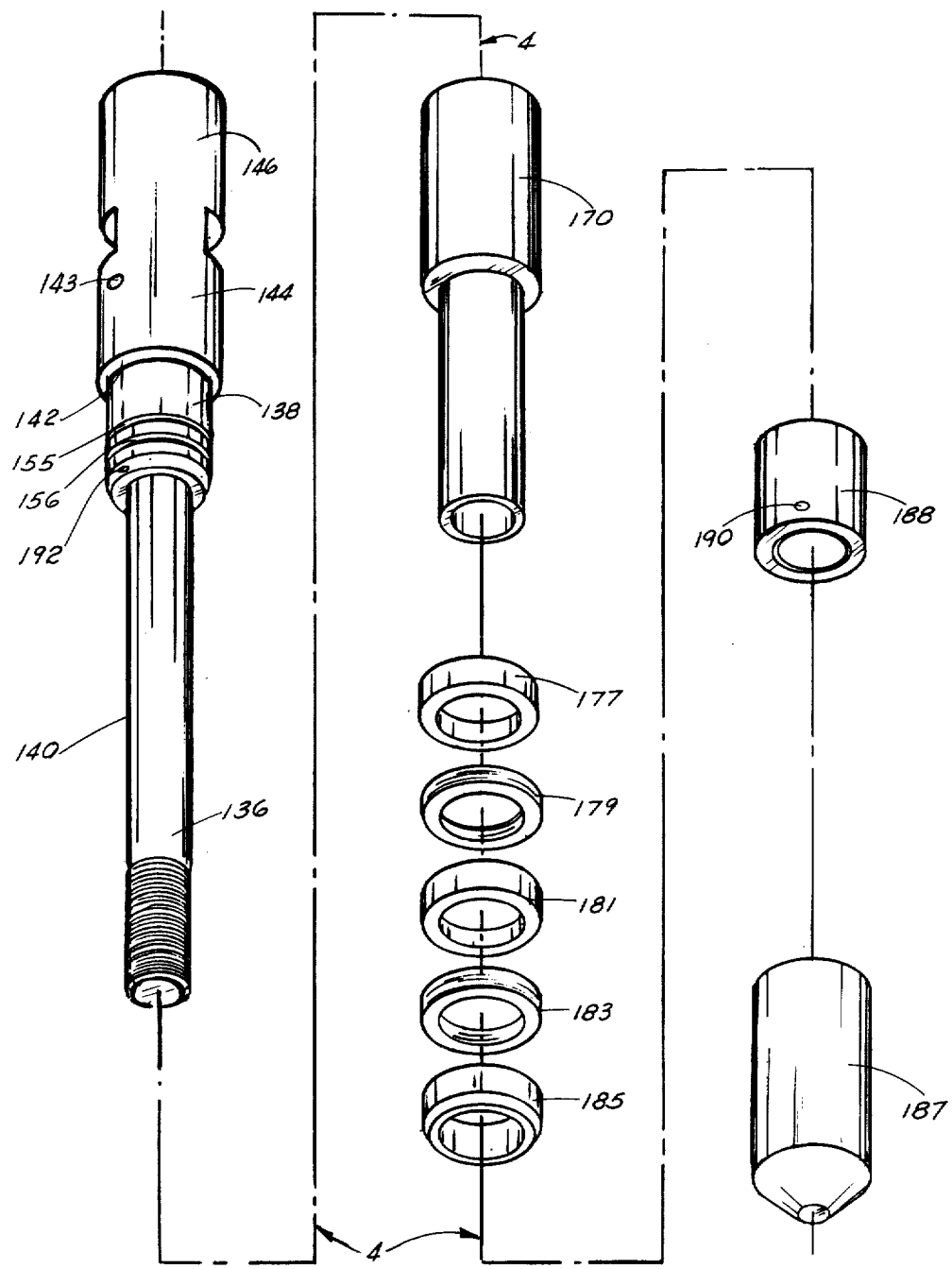
FIG. 4 is an exploded view of the lower mandrel tool.
Figure 5:
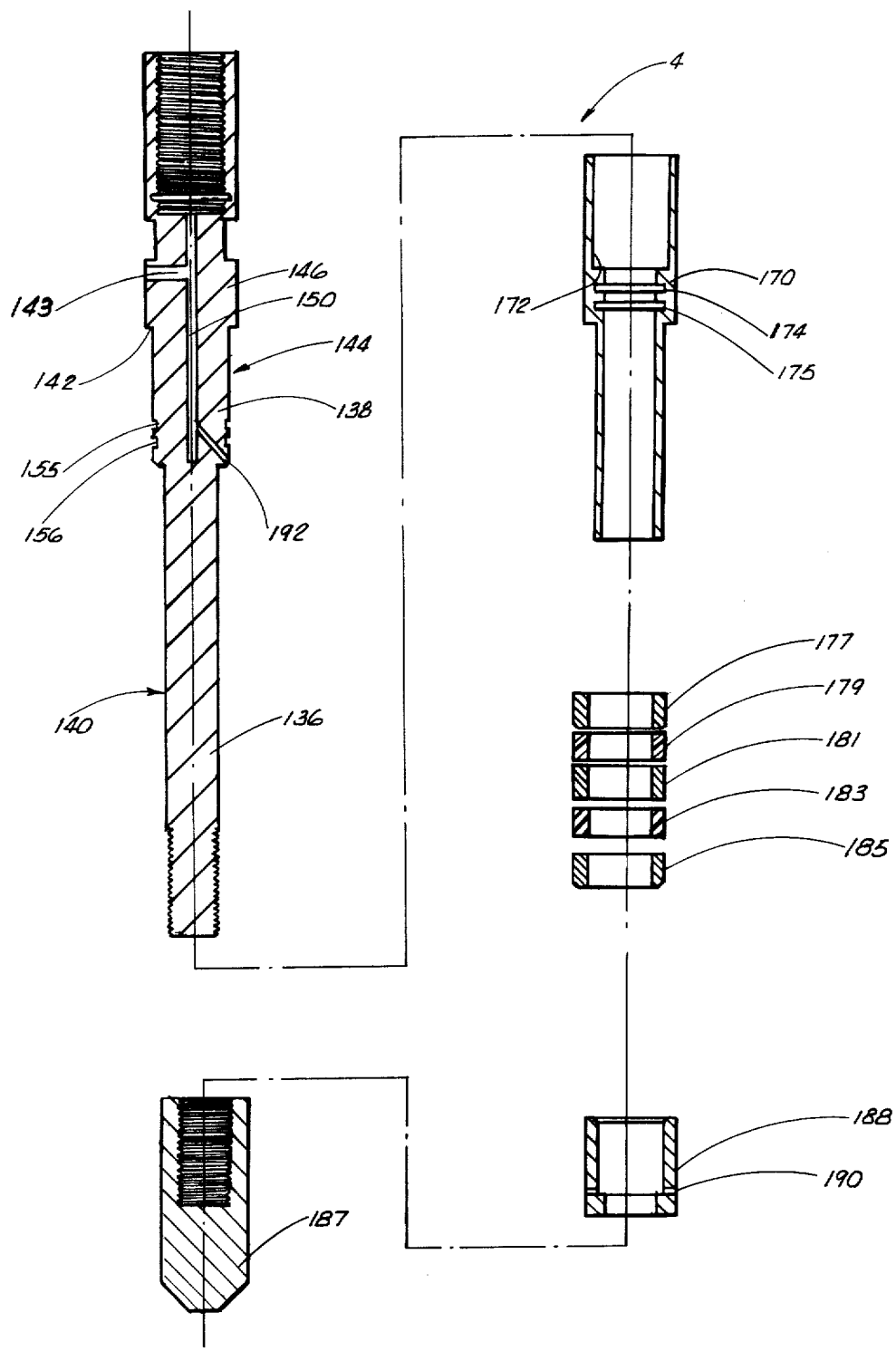
FIG. 5 is an exploded, cross-sectional view of the lower mandrel tool.

As seen in FIGS. 4, 5, and 7, lower mandrel tool 4 comprises basically the same elements as upper mandrel tool 2, in the preferred embodiment. The lowermost tubular bar 6c of bar string 7 is mated on its bottom end to the top end of lower mandrel tool 4. Lower mandrel tool 4 comprises a generally cylindrical, longitudinal collar 160 corresponding to collar 12 of upper mandrel tool 2, a lower mandrel tool body 140, corresponding to upper mandrel tool body 90, comprising a lower shaft portion 136 continuously attached on its top surface to the solid, generally reduced diameter cylindrical bottom portion 138 of topmost piston portion 144 of lower mandrel tool body 140, bottom portion 138 being continuously attached on its top end to the bottom surface of a solid, generally cylindrical, topmost portion 146, a shoulder 142 being thereby formed between the bottom surface of topmost portion 146 and the top surface of bottom portion 138 of piston portion 144 of lower mandrel tool body 140. A longitudinal bore 150, or lower fluid flow passage 150, is provided throughout the topmmost piston portion 144 and the lower shaft portion 136 of lower mandrel tool 4, substantially in alignment with the longitudinal bore 130 of bar string 7, for allowing the flow of test fluid therethrough, piston portion 144 of lower mandrel tool body 140 corresponding to piston portion 92 of upper mandrel tool body 90 and shaft portion 136 of lower mandrel tool body 140 corresponding to lowermost shaft portion 106 of upper mandrel tool body 90. A lower transverse bore 143, or pressurizing jet 143, is provided through the topmost portion 146 of piston portion 144 of lower mandrel tool body 140 for pressurizing the cavity between the outer surface of upper mandrel tool 2, lower mandrel tool 4, and bar string 7 and the inner surface of drill pipe 5, as will hereinafter be disclosed. Also, it should be noted that the bottom portion 138 of piston portion 144 of lower mandrel tool body 140 is provided with a pair of spaced-apart O-rings 155, 156 corresponding to O-rings 105, 106 mounted to top portion 96 of piston portion 92 of upper mandrel tool body 90. Similarily, lower mandrel tool body 4 comprises a lower tool cylinder 170 having a lower, internal shoulder 172 and a pair of spaced-apart O-rings 174, 175 mounted therein just above the shoulder 172, lower tool cylinder 170 being circumferentially mounted to shaft portion 136 of lower mandrel tool body 140, the top surface of lower tool cylinder 170 communicating with the shoulder 142 formed between the bottom surface of topmost portion 146 and the top surface of bottom portion 138 of piston portion 144 of lower mandrel tool body 140, whereas lower tool cylinder 170 corresponds to upper tool cylinder 80 and lower shoulder 172 of lower tool cylinder 170 corresponds to shoulder 82 of upper tool cylinder 80 and O-rings 174, 175 correspond to O-rings 84, 85. Further, a first spacer ring 177, a first resilient, elastomeric, radially expansible sealing element 179, a second spacer ring 181, a second resilient, elastomeric, radially expansible sealing element 183, and a third spacer ring 185, are circumferentially mounted, from top to bottom, respectively, to lower shaft portion 136 of lower mandrel tool body 140. These spacer rings and sealing elements of lower mandrel tool body 140 correspond to the same elements of upper mandrel tool body 90, and are made of basically the same material as above described in the description of the elements of upper mandrel tool body 90. The top surface of first spacer ring 177 communicates with the bottom surface of lower tool cylinder 170, the bottom surface of first spacer ring 177 communicates with the top surface of first sealing element 179, the bottom surface of first sealing element 179 communicates with the top surface of second spacer ring 181, the bottom surface of second spacer ring 181 communicates with the top surface of second sealing element 183, the bottom surface of second sealing element 183 communicates with the top surface of third spacer ring 185. A generally cylindrical sleeve 188, or lower tattle tale 188, corresponding to upper tattle tale 8, and having a fluid escape port 190 corresponding to fluid escape port 10 of upper tattle tale 8, is circumferentially mounted to the shaft portion 136 of lower mandrel tool body 140, the top surface of tattle tale 188 communicating with the bottom surface of third spacer ring 185, and the bottom surface of lower tattle tale 188 communicating with the top surface of bullnose 187, which is a generally cylindrical, solid member having a frusto-conical lower end, bullnose 187 being mated on it top end to the lower end of shaft portion 136 of lower mandrel tool body 140. The lower mandrel tool body 140 comprises a longitudinal bore 150, or lower fluid flow passage 150, throughout the topmost piston portion 144 and the lower shaft portion 136 of lower mandrel tool body 140, substantially in alignment with longitudinal bore 130 of bar string 7, thereby allowing the flow of test fluid therethrough. Lower fluid flow passage 150 corresponds to upper fluid flow passage 98 of piston portion 92 of upper mandrel tool body 90. Sufficient background has now been afforded for a description of the improvements of this invention over the prior art. The improvements are as follows:

a. A transverse bore 192, or lower filling jet 192, provided through bottom portion 138 of piston portion 144 of lower mandrel tool body 140, lower filling jet 192 communicating with lower fluid flow passage 150, and a transverse bore 83, or upper filling jet 83 through the topmost portion 94 of piston portion 92 of upper mandrel tool body 90, upper filling jet 83 communicating with upper fluid flow passage 98;

b. Upper filling jet 83 and lower filling jet 192, as above described, except that upper filling jet 83 and lower filling jet 192 are disposed at an approximately 45° angle to upper fluid flow passage 98 and lower fluid flow passage 150 respectively;

c. A 3/32 inch diameter pressurizinq jet 143;

d. O-rings 110, 111 mounted to the machine-threaded part of the shaft portion 106 of upper mandrel tool body 90.

The prior art teaches of filling jets which are provided in the shaft portion rather than the piston portion of the mandrel tool bodies. This dispositon of filling jets causes a weakening of the shaft portion of the tool bodies, thereby resulting in blowouts or breakages due to this weakening. Also the filling jets have been disposed at a 90° angle to the flow passages in the prior art which has caused frequent blockages of the fluid flow passages and filling jets, thereby preventing "setting" of the mandrel tools as will be hereinafter described, thereby resulting in inoperability of the apparatus and therefore prohibiting hydrostatic pressure testing of the flow conductor. The present invention eliminates these serious problems of the prior art, by providing for filling jets disposed at a 45° angle to the fluid flow passages, thereby allowing particulutes to flow from the fluid flow passages through the filling jets, thereby facilitating "setting" of the mandrel tools as will be hereinafter described, thereby ensuring "setting" of the mandrel tools 2, 4 and thereby facilitating hydrostatic testing of the flow conductor. The provision of a larger receiving port facilitates a broader hydrostatic pressure testing range as will be hereinafter described. The provision of O-rings on the shaft portions at the connections with the bar string prevents the escape of test fluids which, if allowed, would result in inoperability of the apparatus. The apparatus of the present invention is operated in the following manner:

1. Forks 16, 17 of hanging plate 18, as seen in FIG. 9a, are fitted into recesses 13, 14 of collar 12 of upper mandrel tool 2 by a workman (not shown) on oil derrick 100;

2. Upper mandrel tool 2, bar string 7, and lower mandrel tool 4, which are all connected together, are inserted into drill pipe 5, by means of plate 18 travelling downwardly within oil derrick 100;

3. Hydrostatic test fluid (not shown) is injected from some source of test fluid (not shown), which could be a positive displacement water pump, for example, into receiving port 20 provided through topmost portion 94 of piston portion 12 of upper mandrel tool 2, the test fluid then flowing through upper fluid flow passage 98, through longitudinal bore 130 of bar string 7, and lower fluid flow passage 150;

4. The test fluid is allowed to escape through lower filling jet 192 of lower mandrel tool body 140, thereby creating an upward force against lower shoulder 172 of lower tool cylinder 170, and O-rings 155, 156 provided on the bottom portion 138 of piston portion 144 of lower mandrel tool body 140 and O-rings 174, 175 mounted within lower tool cylinder 170 below shoulder 172, prevent the escape of fluid between the space between lower shoulder 172 and the bottom portion 138 of piston portion 144; note that if a leak occurs due to damage to O-rings 174, 175, the test fluid will be allowed to escape through fluid escape port 190 of lower tattle tale 188, and if a leak occurs between the shoulder 142 formed by the bottom surface of topmost portion 146 of piston portion 144 and the top surface of bottom portion 138, then this will alert the operator of the apparatus that O-rings 155, 156 are damaged; assuming that O-rings 155, 156, 174, 175 are not damaged, then the fluid escaping through lower filling jet 192 will create an upward, positive force against lower shoulder 172 of lower tool cylinder 170, thereby causing first spacer ring 177, first sealing element 179, second spacer ring 181, second sealing element 183, and third spacer ring 185 to compress against the upper surface of lower tattle tale 188, the bottom surface of lower tattle tale 188 compressing against the top surface of bullnose 187, thereby causing first sealing element 179 and second sealing element 183 to radially expand into fluid sealing engagement with the inner surface of drill pipe 5, as seen in FIGS. 2 and 8;

5. Step 4. is termed "setting" of the lower mandrel tool 4, and after this occurs, a back pressure of test fluid is formed through lower filling jet 192, through lower fluid flow passage 150, through longitudinal bore 130 of bar string 7, and through upper fluid flow passage 98;

6. The back pressure described in Step 5. above causes the test fluid to escape through upper filling jet 83 of upper mandrel tool 90, the test fluid thus creating a positive, downward force against the internal shoulder 82 of upper tool cylinder 80, thereby causing upper tool cylinder 80 to compress first spacer ring 60, first sealing element 62, second spacer ring 64, second sealing element 66, and third spacer ring 68, against the top surface of upper tattle tale 8, the bottom surface of upper tattle tale 8 compressing against the top surface of connector sleeve 200, thereby causing the first sealing element 62 and second sealing element 66 to radially expand into fluid sealing engagement with the inner wall of drill pipe 5, as seen in FIGS. 1 and 10; O-rings 84, 85 of upper tool cylinder 80 and O-rings 105, 105a of piston portion 92 of upper mandrel tool body 90 perform the same functions as O-rings 174, 175, 155, 156 of lower mandrel tool 4;

7. Step 6. is referred to as the "setting" of the upper mandrel tool 2, and after this occurs, a back pressure is formed through upper filling jet 83 and through upper fluid flow passage 98 and through longitudinal bore 22 of collar 12, thereby causing the test fluid to escape through transverse bore 143 or pressurizing jet 143, provided through topmost portion 146 of piston portion 144 of lower mandrel tool body 140, thereby allowing the flow of the test fluid into the cavity between the outer surface of bar string 7 and the inner surface of drill pipe 5.

8. Hydrostatic test fluid is continuously injected through receiving port 20 of collar 12 until the desired hydrostatic pressure is formed in the cavity between the outer surface of bar string 7 and the inner surface of drill pipe 5, for testing the hydrostatic fluid bearing capacity of drill pipe 5; it should be noted that with the 3/32 inch diameter pressurizing jet 143 of the present invention, rather than the 5/64 inch industry standard injection jet, a hydrostatic pressure testing range of between 1800 p.s.i. and 30,000 p.s.i is facilitated, rather than the 3,000 p.s.i. to 15,000 p.s.i. hydrostatic pressure testing range of pressure testing tools presently in existence.

The above improvements have dramatically increased the efficiency and effectiveness of hydrostatic pressure testing tools for use especially in the oil industry, and have prevented 90% to 99% of all tool breakages, or blowouts, as they are referred to in the oil industry, because of the disposition of the filling jet in the piston portion rather in the shaft portion of the mandrel tool bodies, and at a 45° angle thereto, the 45° angle eliminating most, if not all, of fluid flow passage and filling jet blockages which prevent "setting" of the mandrel tool, thereby resulting in their inoperability, which generally requires disconnecting the tool from the bar string and the drill pipe, and unclogging the jets, thereby resulting in oil rig shutdown time, thereby resulting in excessive costs and delays in the operation of the oil rig. Many other objects and advantages of the present invention will become obvious to those skilled in the art, after reading the above detailed description referring to the attached drawings.

Because many varying and different embodiments may be made within the scope of the inventive concept herein taught, and because many modifications may be made in the embodiment herein detailed in accordance with the descriptive requirement of the law, it is to be understood that the details herein are to be interpreted as illustrative and not in a limiting sense.

What is claimed as invention is:

1. A hydrostatic pipe testing apparatus for testing fluid pressure bearing capacity of flow conducting pipe, comprising: elongated generally cylinderical upper and lower mandrel tools connected by a bar string, and insertable into a pipe to be tested, said upper and lower tools each comprising:
   a. a generally cylindrical elongated collar means, having a central bore and means for facilitating insertion and removal of said upper mandrel tool from an oil well;
   b. a generally cylindrical elongated piston means threadably engageable with said collar means at one end and integrally attached to one end of a shaft means at its other end, said piston means having a central bore coaxial with that of the collar means and a pair of spaced apart seal means circumferentially mounted adjacent the point of attachment between said piston means and said shaft means;

c. a first shoulder means formed by a portion of said piston means, a second shoulder means formed by a portion of said piston means having a smaller outside diameter and disposed at the point of its attachment to said shaft means;

d. a first sleeve means threadably attached at one end to the other end of said shaft means, having a central bore coaxial with a central bore of said shaft means and meeting at its other end with said bar string;

e. second sleeve means circumferentially slidably mounted on said shaft means in such a manner that one end of said second sleeve means communicates with the first shoulder of said piston means, and an internal shoulder means of said second sleeve means communicates with the second shoulder of said piston means;

f. a first spacer ring circumferentially mounted on said second sleeve means and communicating with an external shoulder of said second sleeve means at one end and with a resilient expansible first sealing element at its other end, a second spacer ring mounted adjacent said first sealing element and communicating with a second resilient expansible sealing element at its other end, a third spacer ring mounted adjacent said second sealing element and communicating with a third sleeve means circumferentially mounted on said shaft means between said first sleeve means and said third spacer ring, said sealing elements being radially expansible by a test fluid for sealing engagement with the inner wall of a drill pipe during operation;

g. a longitudinally extending central flow passage for allowing a flow of test fluid therethrough, said flow passage being coaxial with a central bore of said bar string and of said collar means;

h. a transverse bore provided in said piston means for receiving a flow of hydrostatic test fluid and communicating with said central flow passage;

i. a filling jet passage provided in said piston means at a distance from said transverse bore at 45° angle in relation to said central flow passage and fluidly communicating with said central flow passage;

j. a fluid escape port means made in said third sleeve means;

k. a pair of O-rings circumferentially mounted on said shaft portion at the point of connection of said shaft means with said bar string.

2. The apparatus of claim 1, wherein said spacer rings are made of steel and the sealing elments are made of an elastomeric material.

3. The apparatus of claim 1, wherein the diameter of said transverse bore is larger than the diameter of said filling jet passage and smaller than the diameter of said central flow passage of said collar means.

* * * * *